United States Patent [19]
Krueger

[11] 3,920,223
[45] Nov. 18, 1975

[54] PLURAL COMPONENT MIXING HEAD

[76] Inventor: Wallace F. Krueger, 4401 Merriweather Ave., Toledo, Ohio 43623

[22] Filed: July 5, 1973

[21] Appl. No.: 376,878

[52] U.S. Cl. ............................... 259/8; 23/252 R
[51] Int. Cl.² ........................................ B01F 7/24
[58] Field of Search ........... 259/8, 7, 23, 24, 43, 44, 259/66, 67, 97, 105, 107, 108; 23/252, 260, 285

[56] References Cited
UNITED STATES PATENTS

| | | | |
|---|---|---|---|
| 2,215,706 | 9/1940 | Lewis | 259/8 |
| 2,641,412 | 6/1953 | Byberg | 259/43 |
| 3,336,009 | 8/1967 | Spinello | 259/97 |
| 3,450,388 | 6/1960 | Stumb | 259/8 |
| 3,502,305 | 3/1970 | Grum | 259/8 |
| 3,607,124 | 9/1971 | Zippel | 259/67 |

*Primary Examiner*—Robert W. Jenkins
*Attorney, Agent, or Firm*—Jos. R. Scalzo

[57] ABSTRACT

The present Plural Component Mixing Head is an important breakthrough in the known plural resin systems using liquid components such as polyesters, epoxies, urathanes, silicone, alkyd, acrylics and the like. It is particularly useful as a Two Stage Mixing Head whereby solid filler additives may now be added to the mixed liquid resins for body, strength, volume or pure economics. The Two Stage Mixing Head for this important purpose consists essentially of a mixing and dispensing unit having a 1st Stage Mixing Chamber for receiving and dispensing into a 2nd Stage Mixing Chamber the mixed plural component liquid resins, and in the 2nd Stage Mixing Chamber introducing and thoroughly mixing additive solid filler components with the liquid resin mix and dispensing the solid filler and liquid resin mix controlled from the 2nd Stage Mixing Chamber for forming and resin setting of the final mix. An important element in this device is a central and single rotor design actuated by a motor for variable speed rotation. This single rotor with mixing and screw means as an integral part thereof controls and effects all the required mixing and assists with the dispensing progress of the mix in both the 1st and 2nd Mixing Chamber as well as a controlled drawing in of the filler material in the 2nd Stage Mixing Chamber. This single rotor, has a rotor ball head that rotates and seals against a circular and centrally hollow bearing seat in the top of the 1st Stage Mixing Chamber which permits sealing as well as centering and rotation of the single rotor and its rotor mixing and screw means which form an integral part thereof. The single rotor is coupled to the motor coupling above the central hollow bearing seat opening and is spring loaded to force the rotor ball upward and tightly against the centrally hollow bearing seat for positive sealing of the liquid resin components in the 1st Stage Mixing Chamber.

3 Claims, 9 Drawing Figures

PLURAL COMPONENT MIXING HEAD

The addition of solid filler additives into a plural resin system is frequently necessary to impart desired properties to the resultant plastic material and to reduce the quantity and hence cost of the resins required, thus improving both the quality and economics of the system. Solid filler additives are normally introduced batchwise due to a lack of technology of design and system for continuous operation. The technology and systems for plural liquid resin metering, mixing and dispensing is well established for the normal resins in use such as polyesters, epoxies, urathanes, silicones, alkyd, acrylics and the like. In such systems the incorporation into the continuous system of solid filler additives, even when extremely fine and smooth flowing, has been found impractical. Yet, the desirability for introducing such additives is a requirement for expanded demand, utility and economics.

The present invention design and the principles incorporated therein will now permit effective metering and mixing of fillers directly into the mixing head of standard or special metering machines already known and used, thus making it possible to accomplish what has long been sought, namely: the combination of a wide range of solid fillers and filler combinations at almost any desired or required filler loading rate.

As stated, the limited capability of known pumping and metering systems for handling filler loaded resins has long been a discouraging reality. Any apparent success has been short lived due to the inevitable malfunctioning and troublesome maintenance and equipment problems. Introducing a solid filler additive to one of the liquid resin components prior to mixing with a second liquid resin component in a plural component resin system has been attempted with the following disadvantages:

1. Fillers tend to settle out requiring constant, though usually not effective, agitation, and potential clogging of equipment results.
2. Fillers normally have a high oil absorption ration that increases resin viscosity and decreases fluidity requiring higher pressures to maintain flow. Some fillers partially or completely dissolve or react with the resin or absorb the resin, which can prevent a complete reaction of the resins when mixed together and give a completely undesirable end product.
3. Resins requiring filtering within the pumping system could well screen out portions of the filler particular with partial screen clogging. Also where any moisture is a resin contaminant, such as with isocynates, where filters are required for metering control, adding fillers and possible moisture therefrom, can be critically damaging to the system and product.
4. Normal pumping systems will not tolerate solid fillers of any amount. Rotary pumps must be completely free of solid matter or precision fitting will seize and score and rotary shaft seals will be damaged and the unit will seize or leak progressively. Piston pumps specially designed could possibly perform, however, the check valves will operate erratically making required precise metering difficult if not impossible, but surely undependable.
5. It is difficult if not impossible to mix a filler loaded resin component with another resin component and be assured of uniform and intimate mixing in the liquid phase particularly at high ratio blends of resin components, where mixing characteristics are more critical, and over agitation required with consequent excess head generation and possible premature catalytic action and resin reaction occur.

From what has been summarized it is obvious that introducing solid fillers into the resin and then metering and mixing and dispensing the resin mix in standard mixing, metering and dispensing equipment is not feasible or practical for continuous production conditions of operation. The design of the present invention overcomes all of the disadvantages heretofore present, and by the novel and useful Two Stage Metering Head, permits the plural liquid resin components to be circulated and mixed prior to the addition of solid filler additives in a First Stage Chamber and the metered solid filler additive introduced to the resin mix in a Second Stage chamber, wherein it is intimately mixed with the resin mix and then dispensed as thoroughly mixed continuous stream of plural resin components and filler additive.

The present invention assures the ability to meter and feed on a continuous, fast processing step, fillers, consisting of thousands of distinct materials, ranging in partical size from micron ground powders to coarse aggregates, fibers, filaments, etc. with metered chemical liquid components and provides a method of obtaining processing steps involving the combinations of chemicals and fillers which now can achieve heretofore unatainable combinations and results. The present system would find desirable applications in a variety of fields and would provide means for obtaining results not before attainable.

Some of the most obvious varied uses for the present invention at the present time are:

1. Foundry — Sand and binders for core and molds
2. Chemical — Filtration, absorption, recovery, etc.
3. Mining — Mineral precipitation, etc.
4. Plastics — Urathanes, polyesters, liquid polymers, etc.
   Rigid foams — Reactive molding, Extrusions, etc.
   Flexible foams — High filler loadings in cushioning for load control, rigidizing, property control, etc.
5. Construction — Modular walls, building block construction, insulation board for all applications. Cement style construction using fast setting ferrotype cement techniques, etc. Doors, millwork and other moldings.
6. Automotive and motor homes — SMC type continuous in-line molding — pocket and channel void filling for many reasons. Insulation and load bearing applications.
7. Environmental — Precipitation, reactive separation, solidification, etc.
8. Furniture — Rigid castings of polyesters, urathanes, etc., reaction molding for decorative add ons and entire composite assemblies, cushion construction — flexible — integral, highly filled, molded sections to give soft seating without bottoming.

While the above is a listing of the several obvious fields of application, many more uses will become evident when the system is commercialized and in expanded use. The design is not limited in the number of chemicals that can be metered, mixed and then combined with fillers and the entire mixture further mixed and dispensed from the system. The degree of mixing in the second stage can be controlled by the rotor design, motor R.P.M., chamber volume, chamber length and neck down, etc. The basic design permits for additional staging for further filler additives if desired or required as when several fillers must be combined in a progressive manner. Other objects and advantages of the invention will be clearly apparent from the following description of the embodiment of the invention and the accompanying drawings in which:

Figure 1:
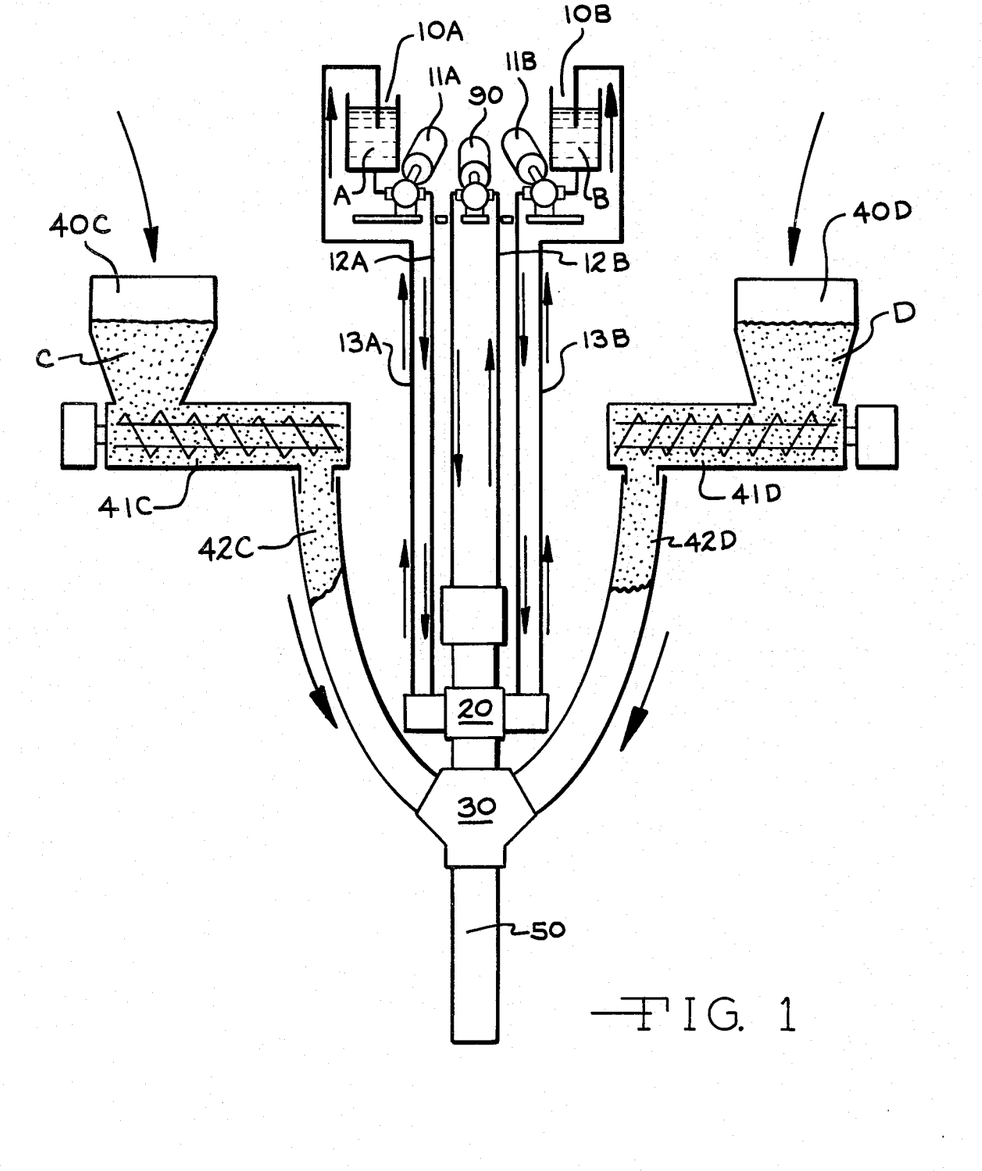
FIG. 1 is a schematic of a total flow system having dual filler additive inlets, FIG. 2-A is an on stream partial cutaway schematic of the mixing chambers, FIG. 2-B is a recycling or offstream partial cutaway schematic of the mixing chambers.

Referring to the accompanying drawings, FIG. 1 shows a total operable system for circulating liquid resins A & B as shown in resin storage tanks 10-A and 10-B and circulated by means of circulating pump 11-A and 11-B, through discharge lines 12-A and 12-B to the mixing head 1st stage mixing chamber 20, and recycled through recycle lines 13A and 13-B back to the storage tanks 10-A and 10-B when the mixing head valves are in closed positions and the system is on recycle and non-operating. When the mixing head valves in the 1st stage mixing chamber 20 are open, the recycling is stopped and the liquid resins A and B are introduced into the 1st stage mixing chamber 20 for mixing and dispensing into the 2nd stage mixing chamber 30, where solid additive fillers C and D in filler containers 40-A and 40-D are metered as by screw feeders 41-C and 41-D into the filler feeder tubes 42-C and 42-D which project into feeder openings in the 2nd stage mixing chamber 30 where they are drawn in and thoroughly mixed with the mixed resins A and B from the 1st stagemixing chamber 20, and the resin and filler mix dispensed after mixing in the 2nd stage mixing chamber 30 through the outlet dispensing nozzle 50.

Figure 2A:
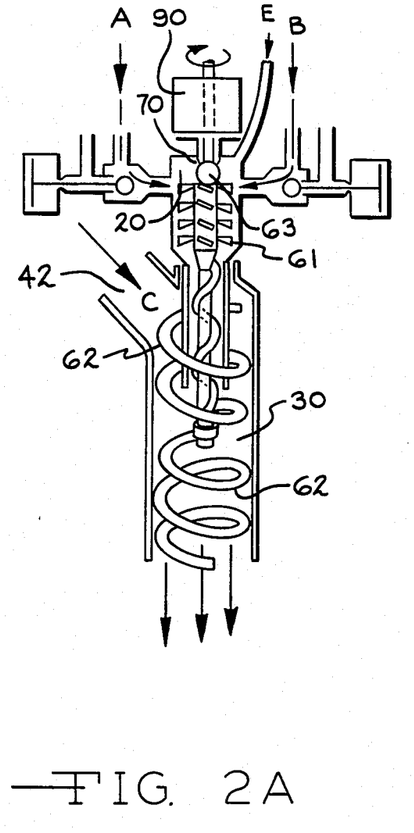
Figure 2B:
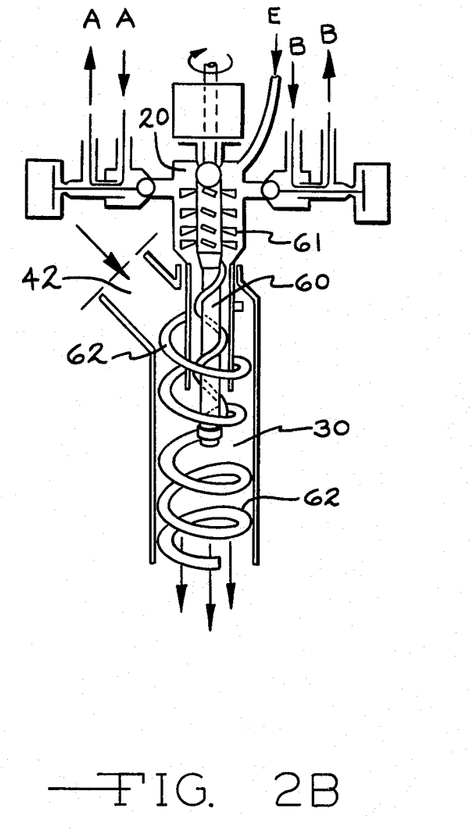

Referring to FIGS. 2-A and 2-B in the accompanying drawings, FIG. 2-A shows the 1st stage mixing chamber 20 in the open or onstream position as well as the 2nd stage mixing chamber 30 receiving filler additives C. Also shown is the rotary mixing shaft 60 with integral 1st stage mixing means 61 and integral filler drawn down and mixing means 62 in the 2nd stage mixing chamber 30, and the rotor ball 63 integral with the rotary mixing shaft 60 at the upper portion of the 1st stage mixing chamber 20 for permitting shaft rotation, sealing and self centering within and against the circular bearing seat 70. Shown also is the rotary motor 90 for imparting rotary motion to the rotary mixing shaft.

FIG. 2-B shows filler feed H-2 stopped, resins A and B on recycle and systems solvent E introduced to clean all surfaces. This solvent cleaning design provides an easy, efficient and required cleaning of all resin wetted surfaces by the introduction of a solvent E under pressure at the top of the first stage mixing chamber 20. The solvent thoroughly cleans all mixing fins and chamber walls and proceeds downward into the second stage mixing chamber 30 and is discharged from the exit nozzle to the atmosphere. The best solvent cleaning results occur by having the mixing rotor shaft 60 rotating slowly to insure bringing all shaft, mixing and screw auger surfaces into contact with the solvent to clean and dislodge any accumulated resin buildup. After sufficient solvent flushing, the solvent flush is stopped and air under pressure is introduced to blow and dry all solvent wetted surfaces.

Figures 3, 4:
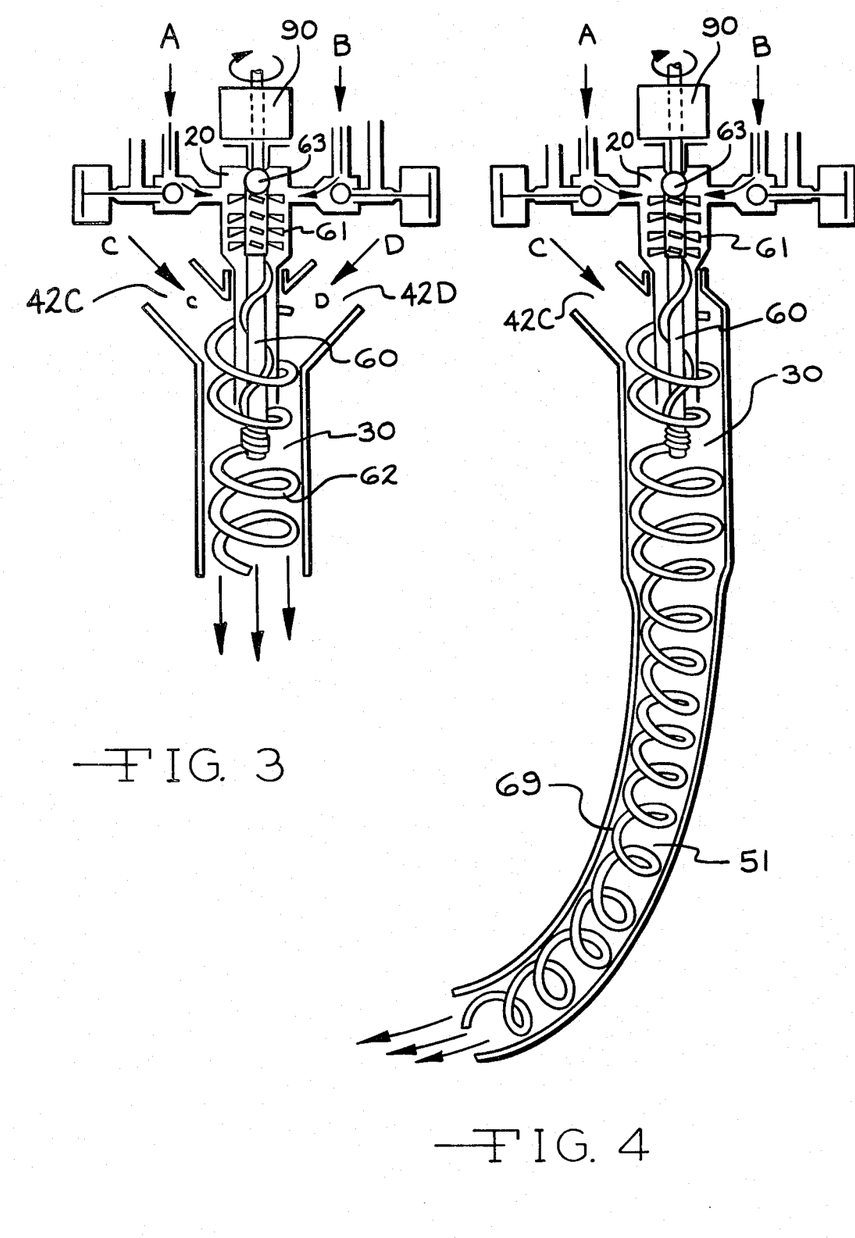
FIG. 3 is an onstream partial cutaway schematic of a system having dual filler additives inlets.
FIG. 4 is an onstream partial cutaway schematic showing a flexible auger, mixing and dispensing tube extension.

Referring to FIGS. 3 and 4 in the accompanying drawing, FIG. 3 shows essentially the same configuration as shown in FIGS. 1 and 2-A and 2-B with the addition of dual filler additive inlets 42-C and 42-D. FIG. 4 shows an additional variation in the mixing and dispensing into and from the 2nd stage mixing chamber 30 by the inclusion of a flexible nozzle tube extension 51 and a flexible mixing and dispensing auger 69 as part and extension of rotary mixing shaft 60. Such a flexible extension of the 2nd stage mixing chamber 30 is a variation in design that could be found useful in special mixing and dispensing operations.

Figure 5:
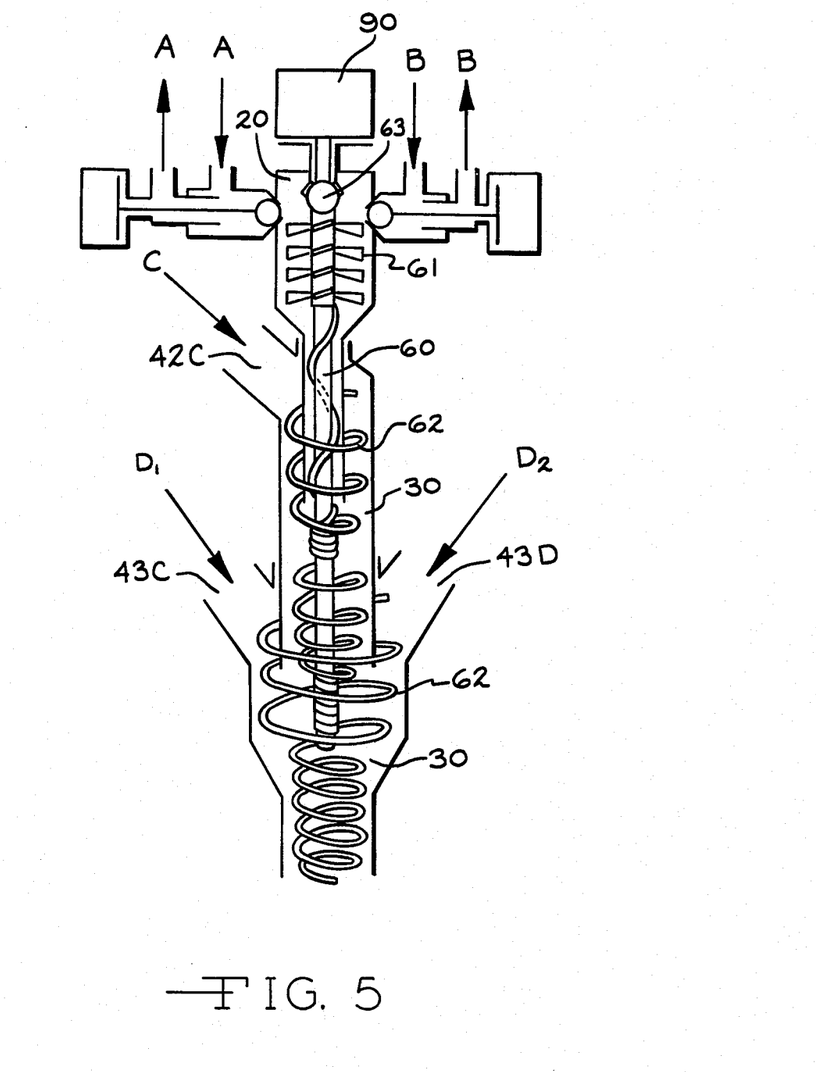
FIG. 5 is a recycling or offstream partial cutaway schematic of a system showing alternate inlets for plural additives.

Referring now to FIG. 5 in the accompanying drawings utilizing the same basic concept of design, a variation of the filler additive possibilities is shown. With the same common rotaty mixing shaft 60, the 2nd stage chamber 30 is shown with filler additive tube inlets 42-C and 43-C and 43-D for introducing the same or different fillers at progressive stages in mixing and dispensing. This arrangement for introducing fillers could be particularly useful when sequencing of filler materials is desirable and when some preliminary mixing of one filler material is necessary before the same or different filler material is further added. The design of FIG. 5 also further illustrates the flexibility that can be obtained in points of mix and introduction of fillers while still utilizing a common rotary mixing shaft of the type described. However, while the advantages of a single common rotary mixing rotor is favored for ease of assembly and flexibility of operation, it is conceivable that further mixing could be achieved if required by a use of additional and separate mixing rotors.

Figure 6:
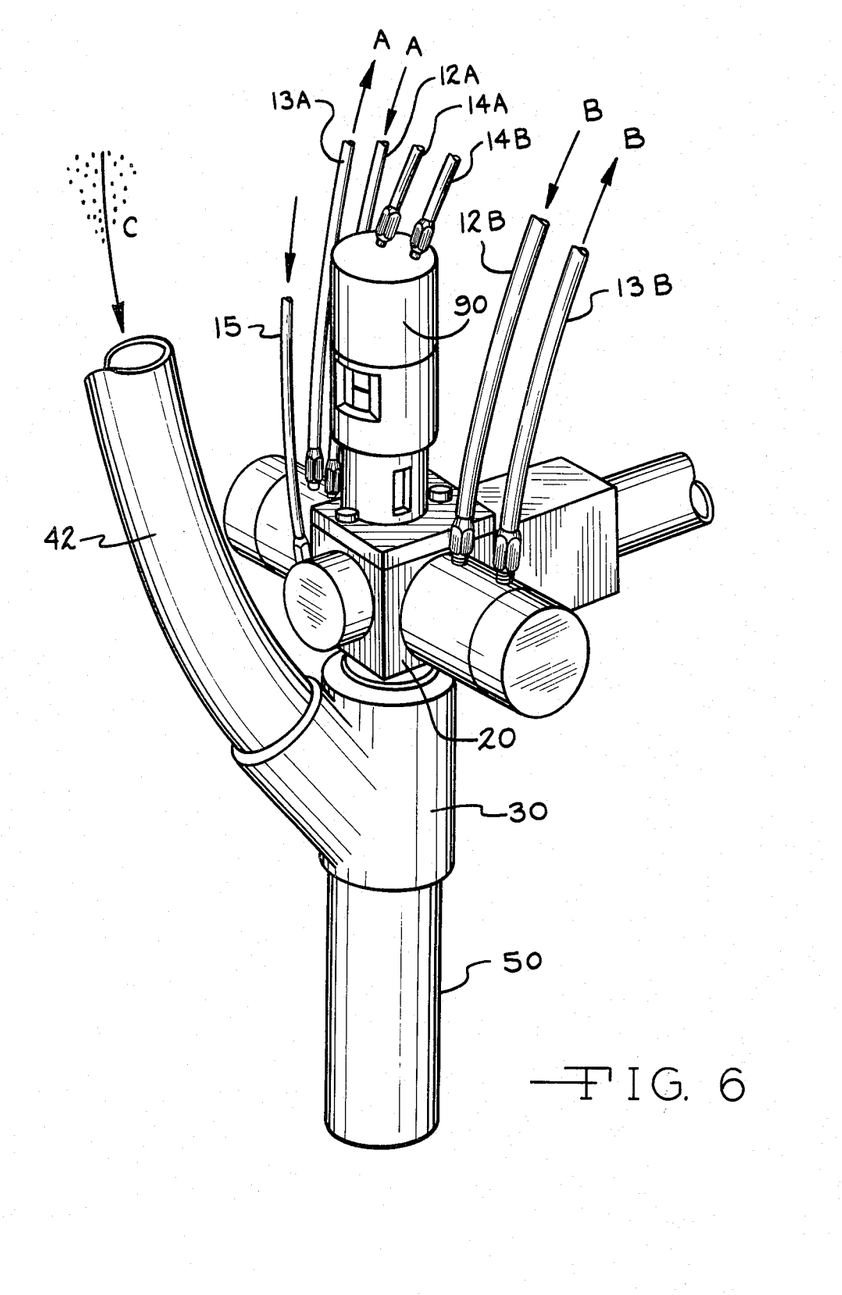
FIG. 6 is a perspective view of the mixing motor and chambers, FIG. 6-A is a partial cutaway perspective drawing of FIG. 5 showing essential internal parts.

Referring to FIG. 6 in the accompanying drawings, FIG. 6 is a perspective view of the entire central mixing assembly with the motor 90, the 1st stage mixing chamber 20, the 2nd stage mixing chamber 30, inlet filler tube 42, the dispensing nozzle 50, and the resin product lines 12-A and 12-B as well as the resin recycle lines 13-A and 13-B. Also shown are hoses 14-A and 14-B for driving a hydraulic motor and a solvent line 15 for introducing solvent E into the mixing chambers for solvent cleaning after usage.

Figure 6A:
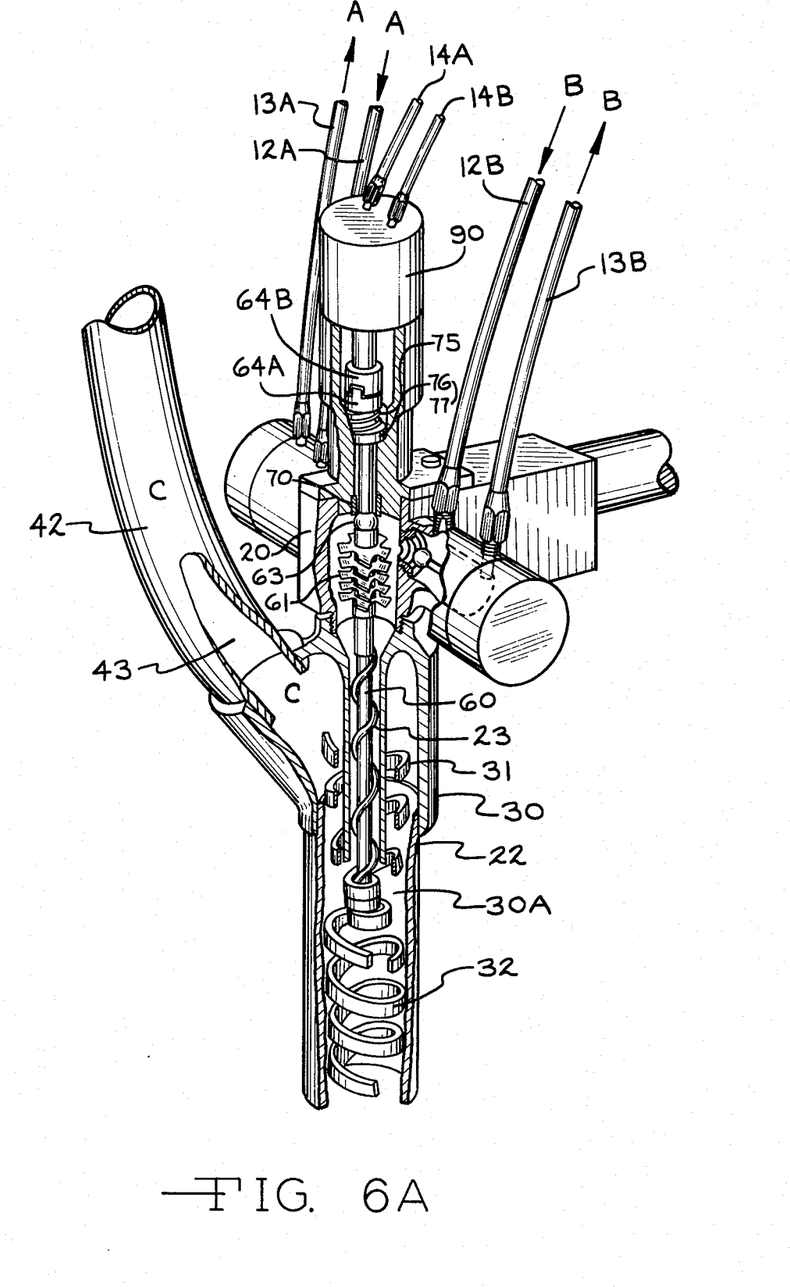
Figure 7:
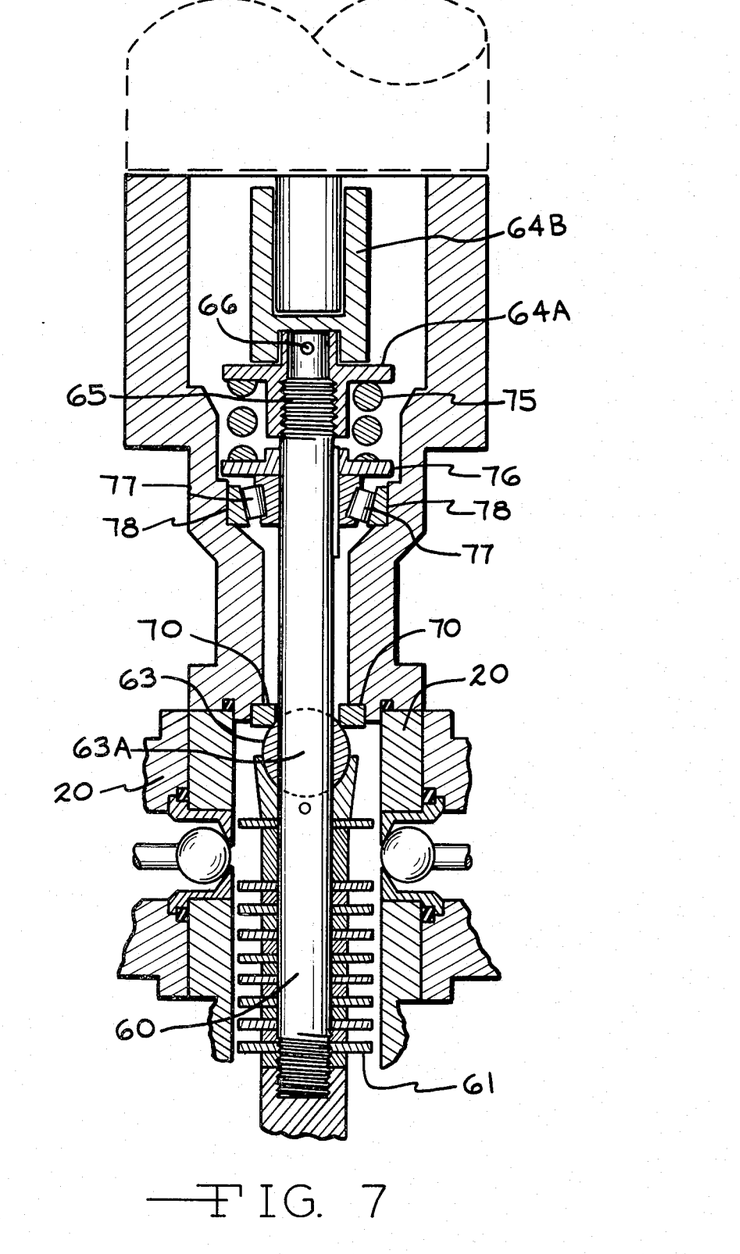
FIG. 7 is a partial verticle center cutaway drawing showing the upper shaft ball seat and spring arrangement.

Referring now to FIGS. 6-A and 7 in the accompanying drawings, the cutaway portion of FIG. 6-A shows the essential parts of the 1st stage 20 and 2nd stage 30 mixing chambers and the rotary mixing shaft 60 that form the essential elements of the present invention. FIG. 7 shows the upper top portion of the rotary mixing shaft 60 assembly for greater clarity and better detail. From FIG. 7 the entire rotary mixing shaft assembly can be seen to consist of a top male shaft coupling 64-A, screwed on to the threaded shaft 65, and pinned with screw 66. The shaft coupling 64-A can be screwed down to compress the main coil spring 75, which is disposed between the bottom spring seat 76 and the male shaft coupling 64-A so as to exert spring pressure upwards against the underside of the male shaft coupling 64-A, thus forcing the entire single rotary mixing shaft 60 and its integral mixing attachment and particularly the rotary shaft sealing, centering and bearing ball portion 63 upwards in tight sealing contact with the periphery of the hollow center bearing and sealing seat 70 located and disposed centrally in the top of the 1st stage mixing chamber 20. In the preferred embodiment the rotor bearing ball 63 and the sealing seat 70 are both made of diamond hard carborundum material so as to provide optimum bearing and sealing surfaces at high rotating speeds, heavy loads with minimum or no lubrication. As also shown in FIG. 7, a circular roller bearing 77 is disposed around the rotary mixing shaft beneath the spring seat for shaft centering and bearing purposes. The circular roller bearing is keyed to the mixing shaft 60 to lock it into rotation with the shaft.

The compression spring 75 which surrounds the mixing shaft 60 forces the circular roller bearing 77 down and into greater bearing contact with the tapered roller bearing surface 78, while at the same time forcing the male shaft coupling 64-A and hence the entire rotary mixing shaft upward. The upward spring pressure on the male shaft coupling 64-A can be adjusted to obtain any desired shaft lifting requirements to force the shaft rotary ball 63 into its sealing seat 70 by screwing the male shaft coupling 64-A further down or up on the top shaft treaded portion 65. In this way the necessary lifting requirements of the mixing shaft 60, depending on the weight and load on the shaft can be adjusted to permit a positive seal with rotary ball 63 under varying weight and load conditions, to prevent any resin mix escaping beyond the 1st stage mixing chamber and beyond the ball sealing seat 70. This ball and seat arrangement is of particularly novel and useful design, in that it is a means of sealing off the resins A and B from leaking beyond the seal point 70 while at the same time providing a bearing surface for both sealing and bearing for rotary self centering shaftmotion.

Another novel feature of this ball sealing design in the fact that the higher the throughput of materials the tighter and more intimately the bearing ball 63 mates with the ball seat 70. Since all liquids and dry fillers are progressively forced and augered out of the chambers as they are mixed, the resultant action is an upward force on the shaft 60 to the ball seal 63. Since the design provides the ability to blend and dispense many tons of material per hour this bearing design is of critical importance to provide a positive seal against all liquid back pressures and allow for self aligning, even with vibratory and unbalanced loads at variable high rotor speeds.

The rotary shaft ball 63 is designed to receive the rotary shaft through a central ball opening 63-A and is secured to the shaft by means of a pin or the like to prevent independent rotation of the ball and shaft.

The mixing element 61 on the rotary shaft 60 in the 1st stage mixing chamber 20 is designed to mix the plural resin fluids, and the design may be varied for material mixed. The preferred design consists of multiple thin finned impellers designed to give high shear to the combined liquids, provide sufficient back pressure for thorough mixing and provide discharge into the 2nd stage. This is provided by clearance control of all mating elements and the pitch of the impellers to get reversals and final discharge at the most efficient rotor R.P.M. The number of mixing elements, the volume of the chamber and the throughput all dependent on the charteristics of the liquids being mixed and blended.

The discharge from the 1st stage mixing chamber 20 is forced down through a 1st stage discharge nozzle 22 that terminates within the 2nd stage mixing chamber 30. A screw means shaft attachment 23 is normally included in this 1st stage discharge nozzle 22 to assist in the discharge or draw down process.

The 2nd stage mixing chamber 30 consists mainly of an elongated chamber that has the rotary shaft 60 extending beyond the 1st stage discharge nozzle 22, and having a screw means shaft attachment 31 that rotates with the shaft and surrounds the outside lower portion of the 1st stage discharge nozzle 22 that acts to draw down the filler additives into the 2nd stage mixing area 30-A below the 1st stage discharge nozzle 22. This mixing area 30-A permits mixing the mixed resins and fillers together by means of a shaft screw extension 32 that rotates with the shaft and mixes as well as assists in moving or discharging the entire resin-filler mix from the 2nd stage mixing chamber.

This screw extension 32 may be modified and altered to give more thorough mixing and blending of the liquids with the filler and at the same time provide a positive discharge action to continually empty the chamber 30-A. Normally a wire spring style auger screw is used as screw extension 32 to mix and blend a filler particulate with a low percentage of liquid (10 to 30% approximately) liquid weight to filler weight). The hollow spiral wire auger provides maximum tumbling, reflow and reversals to achieve efficient thorough coating of the particulate filler with the liquid system. Normally a solid screw-type auger (with or without various modifications) is used as the screw extension 32 at the final discharge nozzle area to give positive outward thrust of mixed materials when viscosity of final mix prevents free flow of discharge. This solid screw type auger design is also desirable when a high percentage of liquids (30 to 99% approximately) (liquid weight to filler weight) is mixed and dispensed and also when materials must be discharged from an extended, reduced diameter nozzle or snorkel and also when fillers have a fiberalization effect when mixed with particular resins and polyols. An example is the introduction of chopped fiberglass as a filler into a resin system, such as polyesters, urathanes, epoxies, etc., and the glass fiber has a strong wetting and affinity for the liquids and an immediate thickening and viscosity rise takes place. This action is common for many combination of materials that can be mixed and dispensed with this design.

Inlet filler openings such as 43 are provided in the 2nd stage mixing chamber 30 for introducing the metered and continuous filler additive flow of material. Filler flow tube 42-C is connected from the filler resevoir 40-C to the 2nd stage mixing chamber 30 and which flow tubes transfer the filler by gravity from the resevoir 40-C to the 2nd stage mixing chamber 30 by gravity.

The variable speed hydraulic motor 90 imparts the rotation to the entire rotor shaft 60 assembly by means of the coupling together of rotor shaft male coupling 64-A with the motor shaft female coupling 64-B.

Realizing that what has been described as preferred embodiments of the invention, variations may be made to what has been disclosed which remain within the purview of this invention. Having thus described in full the present invention, the following is claimed:

I claim:

1. In a plural component mixing system of the class described involving the mixing of plural liquid resins and solid filler additives, a first stage mixing chamber, means for introducing metered quantities of plural resin components into said first stage mixing chamber, means for mixing said plural resin components within said first stage mixing chamber, and means for discharging the mixed plural resin components from said first stage mixing chamber;

a second stage mixing chamber, having an elongated discharge nozzle for introducing mixed plural resin components from said first stage mixing chanber into said second stage mixing chamber, means for introducing metered solid filler additives into said second stage mixing chamber above the outlet of said elongated discharge nozzle, means for thoroughly mixing said filler additives with said plural resin components within said second stage mixing chamber, and means for discharging the resin-filler mix from said second stage mixing chamber, a single common shaft mixing rotor common to both said first and second stage mixing chambers and said common shaft mixing rotor having, a hard bearing material rotor ball portion thereon for bearing, centering and sealing against the periphery of a hard bearing material seating and sealing shaft opening, a spring loaded means on said rotor shaft for lifting and holding said rotor shaft ball portion in bearing seating and sealing contact with said bearing seating and sealing shaft opening periphery and a rotary shaft coupling means secured to said rotary shaft above said bearing seating and sealing shaft opening periphery for coupling to a rotary motor for imparting variable high speed rotary motion to said rotary shaft, a mixing means attachment on each of the first stage and second stage shaft portions of said common shaft mixing rotor for mixing purposes, and a rotary screw means attachment connected to said single common shaft mixing rotor and surrounding said first stage elongated discharge nozzle within said second stage mixing chamber and designed to draw in and control the flow of solid filler additives into said second stage mixing chamber and to maintain an assured filler additive level above the discharge outlet of said elongated discharge nozzle.

2. The same as claim 1 with the single common shaft mixing rotor having, a screw means attachment for assisting in drawing into the second stage mixing chamber the discharged mixed resin components from the first stage mixing chamber, and a screw means attachment for assisting in drawing down and discharging the filler additive-resin component mixture from the second stage mixing chamber.

3. The same as claim 2 with the second stage mixing chamber having an elongated tubular discharge nozzle, and a flexible elongated screw rotor attachment disposed within said elongated tubular discharge nozzle, and said flexible elongated screw rotor attachment attached to the second stage discharge end portion of the single common shaft mixing rotor for further mixing and dispensing of the filler-resin mixture through and from said elongated tubular discharge nozzle.

* * * * *